Nov. 9, 1954 E. F. KINGSBURY 2,694,154
CARD TRANSLATOR OPTICAL SYSTEM
Filed Aug. 25, 1950
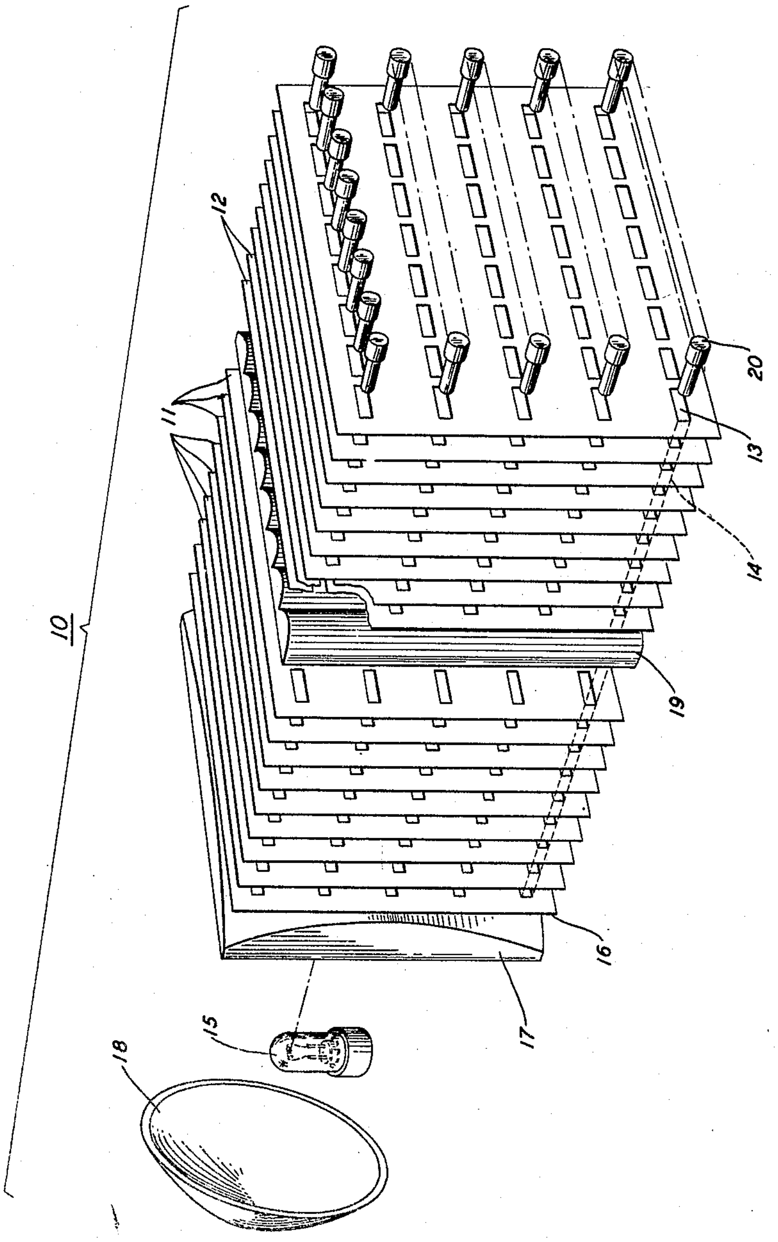
INVENTOR
E. F. KINGSBURY
BY Hugh S. Wertz
ATTORNEY United States Patent Office 2,694,154

Patented Nov. 9, 1954

2,694,154

CARD TRANSLATOR OPTICAL SYSTEM

Edwin F. Kingsbury, Rutherford, N. J., assignor to Bell Telephone Laboratories, Incorporated, New York, N. Y., a corporation of New York Application August 25, 1950, Serial No. 181,337

4 Claims. (Cl. 250—219)

This invention relates to optical systems and, more particularly, to an optical system for card translators, such as, for example, those of the kind described in the copending joint application of E. W. Gent and O. Myers, Serial No. 784,024, filed November 4, 1947, which is now U. S. Patent No. 2,668,877 granted February 9, 1954.

Card translators can be employed in telephone practice to effect interconnection between different automatic telephone ysstems or between two automatic telephone exchanges employing different combinations of code groups and for many other diverse operations in automatic telephone offices. As more automatic telephone dial exchanges are interconnected in an expanding network, the necessity for rapid and reliable transfer from one signal code to another becomes increasingly important. The use of electro-mechanical card translators offers a practical solution to this need in that such changes can be accomplished merely by removing one card from the translator and replacing it with another card having differently coded perforations.

A card translator essentially is made up of an input register to receive and utilize the input information, a card stack including a plurality of cards, each of which is perforated in accordance with a signal code and from which one card is selected by means of the input register for displacement in the card stack, and an output circuit for deriving output information from the displaced card.

The method of operation of such a device essentially comprises three steps as follows: first, transforming the input information for the selection of a single card; second, operating upon the selected individual card to move it; and, third, deriving circuit information from the displaced card output.

In operation, in the normal position before displacement, the perforated cards are stacked so that the card perforations are in alignment and form a plurality of channels which extend the length of the stack. Then after displacement of the selected card, some of these channels are blocked by opaque portions of the displaced card in a pattern which corresponds to the coded perforations of the translated card. For the derivation of output information, radiant energy from a light source at the front end of the card stack is passed through the light channels formed by the apertures in the stacked cards. This light penetrates the stack completely only through those channels which have not been blocked by the opaque portions of the displaced card. At the opposite end of the stack, the light transmitted falls on photosensitive output cells in an illuminated pattern determined by the pattern of the coded perforations in the displaced card, and there are derived electrical impulses representative of the output information. For a more complete discussion of the principles of card translators, reference is made to the above-mentioned patent of E. W. Gent and O. Myers.

The problem of transmitting sufficient light through the light channels has been an important one in such devices. For a compact structure, it is important to limit the size of the cards which make up the stacks and, as incident thereto, the dimensions of the apertures in the cards which form the light channels therethrough. Since, in operation, it is often desirable to utilize at least a thousand of such apertured cards in a card stack, there usually results a light path of considerable length relative to the small cross-sectional dimensions desired for the light channels. In practice, it is found that one of the important factors limiting the restriction in size of card translators is the need for card apertures of such size to insure sufficient light transmission therethrough when aligned in such a card stack Moreover, the importance of long lamp life imposes maximum limitations on the intensity of the primary source. Therefore, it is important that the optical system employed for transmitting the light through the light channels of the card stack be of the optimum possible efficiency to permit the maximum diminution of the dimensions of the card apertures consistent with adequate illumination necessary for reliable operation. Moreover, it will be evident that it is advantageous to utilize a minimum of light sources in order to reduce maintenance problems, to facilitate adjustment and assembly, and to increase the uninterrupted operating life of the system. For these reasons, it is desirable to provide a single source for a plurality of such light channels. Moreover, it is usually convenient in such devices to align the apertures in each card in either parallel vertical columns or parallel horizontal rows. By way of example for purposes of illustration, it will be herein supposed that the apertures are aligned in vertical columns so that the light channels through the card stack form parallel vertical columns.

An object of this invention is to improve the optical system in such a card translator in order to increase the efficiency of light transmission through the card stack.

Another object is to facilitate the assembly and compactness of such a card translator.

Accordingly one feature of the invention is a light source having a line filament which is employed in a manner to obtain almost complete utilization of the light energy radiated. Moreover to increase the efficiency of transmission through the card stack for such a source with a minimum of complexity, there is interposed in the card stack an array of cylindrical field lenses.

These features are incorporated in an exemplary embodiment in accordance with the invention in which a light source having substantially a line filament is positioned opposite the front face of the card stack so that the line filament is transverse both to the light channels through the card stack and to the vertical columns of apertures of each card; light therefrom either directly or by reflection from a spherical backing mirror is directed through a collimating lens for forming light beams illuminating and perpendicular to the front face of the card stack for transmission through the light channels formed by the apertures through the card stack; interposed in the card stack there is an array of cylindrical field lenses, one lens in alignment with each vertical column of apertures, for correcting whatever dispersion has occurred and for focusing an image of the filament source substantially at the opposite end of the card stack; and at the opposite end of the card stack, an array of photosensitive means such as phototransistors, for example, utilizes the transmitted light to actuate the output circuit in accordance therewith.

The invention will be more fully understood by reference to the following more detailed description taken in connection with the accompanying drawing which shows, in perspective view, an exemplary embodiment of the invention. However, it is to be understood that this embodiment is merely illustrative of the principles of the invention. Other arrangements are possible without departing from the spirit and scope of the invention.

With reference to the drawing, there is shown an illustrative arrangement 10 which forms part of a card translator. Therein the card stack 11 comprises a plurality of cards 12 each having a plurality of apertures 13 arranged in accordance with a predetermined code. The cards are so apertured that when properly arranged in the card stack there are formed vertical columns of light channels 14 extending through the card stack across the card stack face. A light source 15 comprising substantially a line filament is positioned parallel to and opposite the middle of the front face 16 of the card stack with the line filament extending horizontally, transverse to the vertical columns of card apertures. Interposed between the card stack and the light source there is positioned the plano-convex collimating lens 17, and behind the source there is positioned a spherical reflector 18 which serves to increase the effective intensity of the source and fill in the card face field in the vertical direction by effectively enlarging the filament vertically and counteracting the spherical aberration of the lens 17 which acts to deviate the marginal rays towards the optic axis. The collimating lens and the spherical reflector are positioned to cooperate in producing light beams illuminating and perpendicular to the front face 16 of the card stack. Uniform illumination perpendicular to the front face is important for penetration of the card stack with a minimum of absorption losses in transmission therethrough. An array of cylindrical lenses 19 is positioned approximately midway through the card stack. Advantage is taken of the much greater horizontal divergence resulting from the use of the horizontal line source 15 by condensing the light beams only in the horizontal plane with these cylindrical lenses, one for each column of channels, and in alignment therewith. The array of lenses can be made very conveniently for the plurality of columns of channels to fill the whole card field from a sheet of transparent Lucite or some such transparent optical material. It has been found that considerable gain in light efficiency can be obtained by adjusting the focal length of the cylindrical lenses to bring the focal point in from the exit aperture of the light channel. This focal length and that of the collimating lens 17 are further adjusted to reduce laterally the filament image so that it can be contained within the exit aperture which is important for the most efficient utilization of the flux. It is this consideration which offsets the attempt to intercept more of the beam by placing a lens either at or towards the entrance aperture which might enlarge the filament image at the exit aperture and offset the amount of light intercepted. In alignment with the light channels there are positioned at the exit apertures, the photosensitive means 20 for developing electrical impulses from the incident radiation. These photosensitive means can comprise phototransistors as mentioned hereinabove. Phototransistors are described in an article entitled "The Phototransistor" by J. N. Shive in the Bell Laboratories Record for August 1950.

By this arrangement, there is conveniently effected high efficiency in utilization of the light source. Moreover considerable simplicity is achieved by the use of the array of cylindrical lenses whereby each lens is made to serve the plurality of light channels that form each vertical column.

A different type of optical system for a card translator is disclosed in a copending application of R. E. Coleman, Jr. and E. F. Kingsbury, Serial No. 181,338, filed August 25, 1950.

What is claimed is:

1. An optical system adapted for use in a card translator having a multiplicity of multi-apertured cards with the apertures thereof in alignment for forming parallel columns of light channels through the card stacks, comprising a substantially line source of light positioned opposite and parallel to the front end of the card stack transverse to the parallel columns, means cooperating with the line source for forming light beams illuminating and perpendicuuar to the front of the card stack, and an array of cylindrical lenses interposed in the card stack with one lens in alignment with each column of light channels for directing the light beams through the card stack, the axes of the cylindrical lenses being parallel to each other and transverse to the line source of light.

2. An optical system adapted for use in a card translator having a multiplicity of cards having a plurality of parallel columns of rectangular apertures elongated in a direction perpendicular to said columns with the apertures thereof in alignment for forming rectangular light channels through the card, comprising a line source positioned opposite and parallel to the front end of the card stack and to said elongated apertures and transverse to the parallel columns, means comprising a collimating lens cooperating with the line source for forming light beams illuminating and perpendicular to the front end of the card stack, and an array of cylindrical lenses interposed in the card stack having one lens in alignment with each column of light channels for cooperating with the collimating lens for forming an image of the light source at substantially the opposite end of the card stack, the axes of the cylindrical lenses being parallel to each other and transverse to the line source of light.

3. An optical system adapted for use in a card translator having a plurality of multi-apertured cards with the apertures thereof in alignment for forming parallel columns of light channels through the card stack, said apertures being elongated in a direction perpendicular to said columns, comprising a line source of light positioned opposite and parallel to the front end of the card stack and to said apertures and transverse to said parallel columns, reflecting means positioned behind the light source, a collimating lens interposed between the light source and the card stack coopertaing with the reflecting means for forming light beams illuminating and perpendicular to the front end of the card stack, an array of cylindrical lenses interposed in the card stack with one lens in alignment with each vertical column for directing the light beams through the card stack, the axes of the cylindrical lenses being parallel to each other and transverse to the line source of light, and photosensitive means at the opposite end of the card stack in alignment with the light channels.

4. An optical system according to claim 3 in which the collimating lens cooperates with each of the cylindrical lenses of the array to produce an image of the light source substantially at the opposite end of the card stack.

References Cited in the file of this patent

UNITED STATES PATENTS

| Number | Name | Date |
|---|---|---|
| 1,328,294 | Parker | Jan. 20, 1920 |
| 1,341,338 | Parker | May 25, 1920 |
| 1,369,764 | Van Der Byl | Feb. 22, 1921 |
| 1,657,270 | Muller et al. | Jan. 24, 1928 |
| 2,052,844 | Prusso et al. | Sept. 1, 1936 |
| 2,438,825 | Roth | Mar. 30, 1948 |
| 2,482,242 | Brustman | Sept. 20, 1949 |
| 2,515,862 | Carlton et al. | July 18, 1950 |
| 2,519,688 | Mitchell | Aug. 22, 1950 |